Aug. 24, 1965 R. W. BURDEN 3,202,062
ACTUATOR
Original Filed April 23, 1962
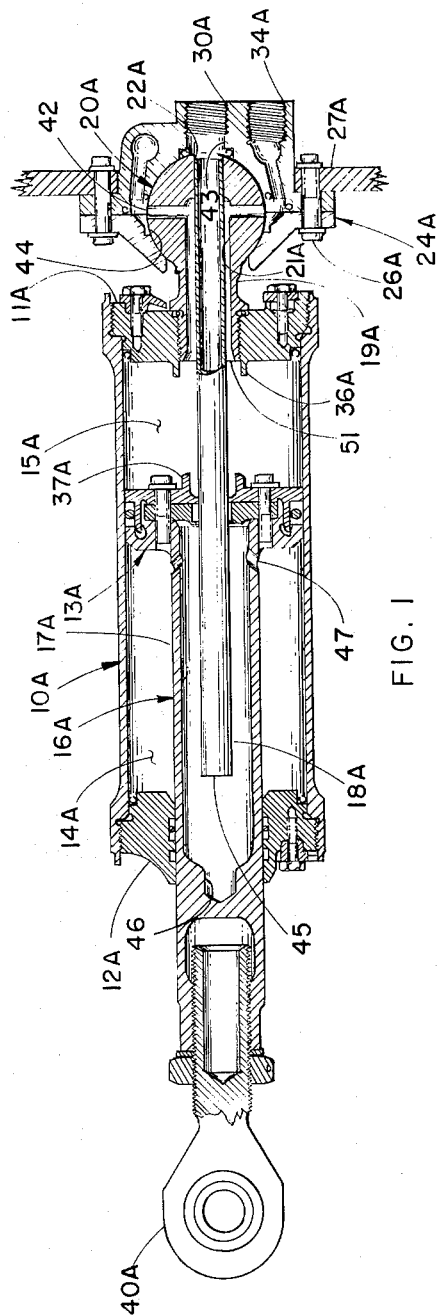
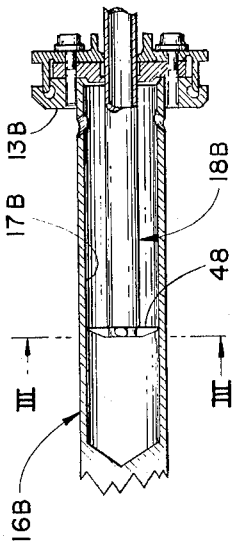
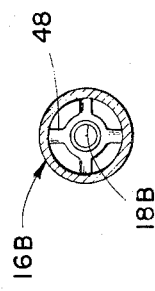
ROBERT W. BURDEN
INVENTOR.
BY J.H.C. Goldwire
AGENT.

United States Patent Office 3,202,062
Patented Aug. 24, 1965

3,202,062
ACTUATOR
Robert W. Burden, Dallas, Tex., assignor to Ling-Temco-Vought, Inc., Dallas, Tex., a corporation of Delaware
Original application Apr. 23, 1962, Ser. No. 189,643, now Patent No. 3,152,522, dated Oct. 13, 1964. Divided and this application Aug. 26, 1963, Ser. No. 304,557
6 Claims. (Cl. 92—85)

The present application is a division of the co-pending application Serial Number 189,643 filed April 23, 1962, since issued as U.S. Patent No. 3,152,522.

This invention relates to fluid-powered actuators and means for mounting the same and effecting connection into a fluid powering system and in particular to an actuator in which the pivotal mounting means serves also to connect the actuator into the fluid powering system.

While reference will be made herein, in describing the constructions shown in the various figures of the drawing, to a hydraulic actuator adapted for powering by a hydraulic system, it will be understood that the actuators shown are operable by other fluids, e.g. a gas, supplied under pressure, and that the invention is not limited to an actuator powered by a hydraulic system.

A major object of the present invention is to provide an improved actuator having pivotable means for attaching the actuator to a fixed structure and carrying the flow channels for connection of the actuator into a fluid powering system.

A related object is to provide an actuator and connecting and mounting means therefor which allow pivoting of the actuator and dispense with flexible tubing for connecting the actuator into the fluid powering system.

Other objects and advantages will be apparent from the specification and claims and from the accompanying drawing illustrative of the invention.

In the drawing,

FIGURE 1 is a longitudinal, sectional view of an embodiment of the invention;

FIGURE 2 is a longitudinal, sectional view of a form of the piston rod and tube employable in the embodiment shown in the previous figure; and FIGURE 3 is an end view of the tube end guide.

Referring now to FIGURE 1, an embodiment of the invention is shown wherein the piston 13A is movable relative to the bulkhead 27A or other fixed structure. The piston 13A divides the cylinder 10A into first and second chambers 14A, 15A and has therethrough a central, axial opening. According to the nomenclature adopted, the cylinder first end wall 11A is the one approached by the piston 13A as the rod 16A is fully retracted into the cylinder 10A. The second end wall 12A, at the opposite end of the cylinder 10A, has a generally cylindrical opening through which the rod 16A extends, the latter being concentrically mounted on one face of the piston 13A and having an end 40A lying outside the cylinder and adapted for mechanical connection of a body to be moved by the actuator.

The ball 20A, rigidly mounted on one end of the cylinder 10A, has a shank 19A which is threaded into an opening in, and thus rigidly affixed to, the first end wall 11A, the ball being on the outer end of the shank. The ball 20A is provided with mutually spaced, first and second ports 22A, 42, one in its crown and one, for example, at its equator. As shown, more than one equatorial port 42 may be employed. The spherical socket 24A receiving the ball 20A is adapted for mounting on a bulkhead 27A or other fixed structure as by bolts 26A.

First and second ports 43, 44 opening interiorly of the socket 24A are adapted for connection with respective hydraulic lines (not shown) through threaded openings 30A, 34A in the outer surface of the socket. The socket ports 43, 44 are made larger than the ball ports 22A, 42 with which they are in register in order that they will continue to communicate with the same throughout the range of pivoting of the cylinder 10A on the fixed structure 27A.

A rigid tube 18A has an open end sealingly and rigidly mounted in the ball 20A in communication with the first port 22A. The tube 18A extends through a passage 21A in the ball 20A and shank 19A into the cylinder second chamber 15A, thence through the central opening of the piston 13A into the piston rod 16A, which is provided with an axial passage 17A of larger diameter than the tube 18A and extending from the piston 13A toward the rod outer end 40A. The inner end of the rod 16A encircles and seals off the axial opening in the piston 13A, and any appropriate means are employed to seal between the tube 18A and piston 13A where the tube slidably passes through the piston opening. The portion of the tube 18A received within the rod passage 17A has a free end 45 which is open to provide communication between the respective interiors of the tube 18A and rod 16A. At its outer end, the rod passage 17A has a reduced-diameter portion 46 which is only slightly larger in diameter than the tube 18A and is entered by the tube free end 45 upon the rod approaching complete retraction. The rod passage 17A is connected with the cylinder first chamber 14A through an opening 47 in the rod 16A adjacent the piston 13A. The opening 47 is positioned to lie within the cylindrical opening of the second end wall 12A, upon the rod 16A approaching and reaching full extension, and thus to be at least partially blocked by material of the second end wall.

The passage 21A within the shank 19A and ball 20A is coaxial with the rod passage 17A and terminates within the ball after intersection with the ball second port 42. Thus forming a conduit coaxial with the tube 18A, this passage 21A extends axially through the ball 20A and shank 19A and through an opening 51 in the inner end of the shank into the cylinder second chamber 15A, the opening being encircled by an annular flange or shoulder 36A with a straight-walled, cylindrical inner surface. Flow through the ball-and-shank passage 21A thus is external of the tube 18A.

On the face of the piston 13A adjacent the first end wall 11A is an anular flange 37A whose straight-walled exterior surface is of only slightly less diameter than and mates closely with the corresponding surface of the end wall flange 36A, with which it is concentric, upon the piston rod 16A approaching full retraction in the cylinder 10A. In a typical application, the clearance between the mating surfaces of the two flanges 36A, 37A is .010 inch.

When, for example, hydraulic fluid under pressure is admitted into the first threaded opening 30A, the flow is through the tube 18A into the rod passage 17A and from there into the cylinder first chamber 14A through the rod opening 47. The accompanying movement of the piston 10A to the right, if continued to the end portion of the piston stroke, mates the two close-fitting flanges 36A, 37A encircling the opening 51 into the shank passage 21A and thus partially blocks outflow of fluid from the second chamber 15A into the hydarulic return line (not shown) through passage 21A, ball second port 42, and socket opening 34A and consequently slows the rate of retraction of the rod 16A, which retraction is stopped by the piston 13A striking the end wall flange 36A. At the same time, the tube free end 45 enters the close-fitting, reduced-diameter portion 46 of the rod passage 17A, thus greatly restricting the flow of fluid under pressure into the first chamber 14A via the open end 45 of tube 18A; the rate of travel of the rod 16A thus is further snubbed. In addition, it is common for a hydraulic actuator to spend most of the time in the retraction condition, and in this condition the free end 45 of the rod is supported in the rod passage reduced-diameter portion 46 and thus protected from the possibly deleterious effects of vibrations and large accelerations. It will be noted that both the construction wherein the rod end 45 enters the pasasge reduced-diameter portion 46 and the construction wherein there is mating of matching flanges 36A, 37A cooperate to serve a common end, and that one or the other may be omitted as may be desired without loss of the needed snubbing of rod travel upon complete retraction of the rod 16A.

Upon reversing the hydraulic flow, fluid enters the second threaded opening 34A, passes through the second ports 44, 42 of the socket and ball, and flows through the shank passage 21A into the second chamber 15A, thus moving the piston 13A to the left. Displaced fluid flows from the cylinder first chamber 14A through the rod opening 47 into the rod passage 17A, thence into the tube open end 45, through the tube 18A, and out the first threaded opening 30A into a hydraulic system return line (not shown). As the rod 16A nears full extension, its motion is snubbed by partial blockage of the rod opening 47 by material of the end wall 12A. It will be understood that a snubbing or slowing action is experienced, at either end of the stroke of the piston 13A, when the piston starts to move away from an adjacent one of the end walls 11A or 12A as well as when, as described, it approaches one or the other of the end walls.

In FIGURE 2 the rod 16B is shown as having a passage 17B which does not have at its outer end a reduced-diameter portion such as described above. All of the rod passage 17B through which the tube 18B extends is cylindrical and of the same diameter; and the tube 18B bears, rigidly mounted on its free end, a sliding guide 48 which engages the wall of the passage 17B on each side of the tube 18B. In this way, the tube free end is provided with support. The guide 48 may be of any suitable material such as metal or a heat-resistant, tough plastic, and its form must be such as to leave a free flow-path between the open end of the tube 18B and the rod passage 17B adjacent the piston 13B, the guide for example having four arms as shown in FIGURE 3. The rod 16B, rod passage 17B, and tube 18B otherwise may be made exactly as in FIGURE 1 and may optionally be employed in the actuator of FIGURE 1.

Almost invariably, the body directly actuated by and to which a hydraulic motor is connected is a lever. Connection is at, for example, the rod end 40A (FIGURE 1) of the actuator of the example. As the rod 16A extends and retracts, therefore, the rod end 40A follows an arcuate path, and the cylinder 10A is pivotally deflected relative to the fixed structure 27A on which it is mounted. Thus, whereas the actuator centerline will be at a given location when the piston rod is at an intermediate point of extension, the actuator centerline often is deflected in one direction at full retraction and in an opposite direction at full extension. The hydraulic system tubing (not shown) to the actuator is in the form of metallic tubes rigidly mounted on fixed structure relative to which the actuator is pivotable. To make hydraulic connection into the two ends of the actuator, therefore, the connecting means employed must make allowance for the pivoting motion of the actuator. In the past, this has been accomplished by employing flexible tubing in the terminal portions of the two hydraulic lines to a double-acting actuator. As the severity of operating conditions has increased, these lines have been rendered inadequate, for no known materials of construction have been available which could enable them to withstand the operating pressures and temperatures involved and yet retain a flexible form. In a high-pressure line, for example, working pressure commonly may stand at 4,000 p.s.i., while pressure surges may range up to 6,000 p.s.i.; meanwhile, the ambient air temperature may range to 650° F. To provide a tube flexible enough to withstand actuator pivoting and yet capable of resisting the high temperatures and pressures involved, coiled metallic tubes have been employed to make hydraulic connection at each end of the actuator. While these have met with a degree of success, their high bulk is very objectionable in aircraft applications, where limitations of space often preclude their use or make impossible their proper placement with respect to actuator movement.

In the present construction, no flexible tubing is employed; the actuator is connected to the hydraulic lines through rigid connection of the latter to the ports 30A, 34A and by means of the same structure is pivotally mounted on the bulkhead 27A. Rotation of the ball 20A in the socket 24A allows motion of the actuator relative to the bulkhead 27A and fixed hydraulic ports, 30A, 34A, 28, while at the same time maintaining fluid-tight hydraulic connections.

While only one embodiment of the invention, together with several modifications thereof, has been described herein and shown in the accompanying drawing, it will be evident that various further modifications are possible in the arrangement and construction of its components without departing from the scope of the invention.

I claim:
1. In combination,
a fluid-powered actuator having a cylinder and a piston slidably dividing the cylinder interior into first and second chambers, the piston having an opening therethrough;
a rod mounted on one face of the piston;
a ball rigidly mounted on one end of the cylinder;
a spherical socket receiving the ball and adapted for mounting on a fixed structure;
mutually spaced, first and second ports in the ball;
a rigid tube fixed relative to the ball and having a portion extending axially of the cylinder and sealingly and slidably through the piston opening, the tube having communication with the first port and said tube portion having a free end;
a passage of larger diameter than the tube and extending axially within the rod, which passage receives the tube portion extending through the piston and has an opening connecting the passage with the cylinder first chamber at a location adjacent the piston, the passage having communication with the tube interior;
a passage connected with the second part and extending through the ball, said passage having a wall;
an opening from the last-named passage into the second chamber;
and first and second ports in the socket adapted for connection with respective lines of a fluid powering system and respectively communicating, throughout a range of rotation of the ball in the socket, with the first and second ports of the ball, the ball having a shank by means of which it is rigidly mounted on said one end of the cylinder,
said passage connected with the second port and extending through the ball having extension within and axially of the shank to said opening into the second chamber,
the tube extending through the shank within said passage connected with the second port and having an end rigidly and sealingly mounted within the ball in communication with the first port, said tube having a wall radially spaced inwardly of said passage from said passage wall,
flow through the passage connected with the second port, within the shank, being external of the tube.
2. In combination,
a fluid-powered actuator having a cylinder and a piston slidably dividing the cylinder interior into first and second chambers, the piston having an opening therethrough;
a rod mounted on one face of the piston;
a ball rigidly mounted on one end of the cylinder;
a spherical socket receiving the ball and adapted for mounting on a fixed structure;
mutually spaced, first and second ports in the ball;
a rigid tube fixed relative to the ball and having a portion extending axially of the cylinder and sealingly and slidably through the piston opening, the tube having communication with the first port and said tube portion having a free end;
a passage of larger diameter than the tube and extending axially within the rod, which passage receives the tube portion extending through the piston and has an opening connecting the passage with the cylinder first chamber at a location adjacent the piston, the passage having communication with the tube interior;
a passage connected with the second port and extending through the ball, said passage having a wall;
an opening from the last-named passage into the second chamber;
and first and second ports in the socket adapted for connection with respective lines of a fluid powering system and respectively communicating, throughout a range of rotation of the ball in the socket, with the first and second ports of the ball, the cylinder having an end wall with a cylindrical opening through which the rod extends,
the rod passage opening lying within the end wall cylindrical opening and being at least partially blocked by material of the end wall when the rod is fully extended from the cylinder.

3. In combination,
a fluid-powered actuator having a cylinder and a piston slidably dividing the cylinder interior into first and second chambers, the piston having an opening therethrough;
a rod mounted on one face of the piston;
a ball rigidly mounted on one end of the cylinder;
a spherical socket receiving the ball and adapted for mounting on a fixed structure;
mutually spaced, first and second ports in the ball;
a rigid tube fixed relative to the ball and having a portion extending axially of the cylinder and sealingly and slidably through the piston opening, the tube having communication with the first port and said tube portion having a free end;
a passage of larger diameter than the tube and extending axially within the rod, which passage receives the tube portion extending through the piston and has an opening connecting the passage with the cylinder first chamber at a location adjacent the piston, the passage having communication with the tube interior;
a passage connected with the second port and extending through the ball, said passage having a wall;
an opening from the last-named passage into the second chamber;
and first and second ports in the socket adapted for connection with respective lines of a fluid powering system and respectively communicating, throughout a range of rotation of the ball in the socket, with the first and second ports of the ball, the rod passage having a portion reduced to a diameter only slightly exceeding that of the tube free end and into which reduced-diameter portion the tube free ends enters and remains upon complete retraction of the rod into the cylinder, said reduced-diameter portion of the rod passage being spaced and distinct for said piston opening.

4. In combination:
a cylinder having ends closed by first and second end walls each having a central opening;
a piston having therethrough a central opening and slidably mounted in the cylinder for dividing the interior of the latter into first and second chambers;
an annular shoulder on a face of the piston spaced radially outwardly from and concentric with the piston opening;
an annular shoulder on the first end wall concentric with the piston shoulder and closely mated with the latter upon the piston reaching one end of its stroke;
a shank rigidly fixed in the first end wall opening and having on its outer end a ball;
a first port in the crown and a second port at the equator of the ball;
a tube slidably and sealingly extending through the piston opening and having a free end and an end rigidly fixed relative to the ball, the interior of the tube communicating with the first port;
a rod concentrically mounted on the piston and extending through the opening of the second end wall;
a passage of greater diameter than the tube and extending axially in the rod, the passage extending from the piston opening toward the outer end of the rod;
a reduced-diameter portion of the passage of only slightly greater diameter than the tube and located where it is entered by the tube free end upon complete retraction of the rod;
an opening from the rod exterior into its interior adjacent the piston, the rod opening being at least partially covered by material of the second end wall upon complete extension of the rod;
a passage in the ball which opens into the second port and extends through the shank into the second chamber in a location encircled by the annular shoulder of the first cap;
a socket receiving the ball and provided with means for mounting the socket on a given fixed structure;
and first and second ports in the socket adapted for connection with respective lines of a fluid powering system and respectively communicating, throughout a range of pivoting of the shank on the fixed structure, with the first and second ports of the ball.

5. In a fluid-powered actuator having a cylinder, a piston dividing the cylinder interior into first and second chambers, a port communicating with the second chamber, and means for connecting the port to a line of a fluid powering system, the construction comprising:
an axial opening through the piston;
a hollow rod enclosing a passageway communicating with the piston opening, which rod is rigidly mounted on the piston for extension through and from the first chamber and which has an opening adjacent the piston and communicating between the first chamber and rod passage;
a tube of smaller diameter than the rod passage and having an end rigidly mounted relative to the cylinder;
means for connecting the tube end to a line of a fluid powering system;
a reduced-diameter portion of the rod passage spaced from the piston;
a portion of the tube slidingly and sealingly extending through the piston opening and having a free end of only slightly less diameter than the rod passage reduced-diameter portion and received in said portion when the rod is fully retracted into the cylinder;
and structure rigidly fixed relative to the cylinder and at least partially blocking the opening adjacent the piston upon and just prior to arrival of the rod at its position of full extension from the first chamber.

6. In a hydraulic actuator having a cylinder, a piston dividing the cylinder interior into first and second chambers, a port communicating with the second chamber, and means for connecting the port to a line of a fluid powering system, the construction comprising:
an axial opening through the piston;

a hollow rod enclosing a passageway communicating with the piston opening, which rod is rigidly mounted on the piston for extension through and from the first chamber and which has an opening adjacent the piston and communicating between the first chamber and rod passage;

a tube of smaller diameter than the rod passage and having an end rigidly mounted relative to the cylinder;

means for connecting the tube end to a line of a fluid powering system;

an end wall of the cylinder approached by the piston as the rod is retracted to its fullest extent into the first chamber;

an annular flange on said end wall with a straight-walled cylindrical surface and enclosing said port communicating with the second chamber;

an annular flange on the piston with a straight-walled cylindrical surface which closely mates with the end wall annular flange cylindrical surface upon retraction of the rod to its fullest extent into the first chamber;

and structure rigidly fixed relative to the cylinder and at least partially blocking the opening adjacent the piston upon and just prior to arrival of the rod at its position of full extension from the first chamber.

References Cited by the Examiner

UNITED STATES PATENTS

| | | | |
|---|---|---|---|
| 908,414 | 12/08 | Mellin | 92—119 |
| 1,098,157 | 5/14 | Koken | 92—113 |
| 1,500,921 | 7/24 | Bramson et al. | 92—119 |
| 1,717,485 | 6/29 | Wirz | 92—119 |
| 1,874,248 | 8/32 | Davis | 92—119 |
| 1,972,017 | 8/34 | Hulshizer | 92—113 |
| 2,293,167 | 8/42 | Overbeke | 92—119 |
| 3,023,739 | 3/62 | Dickson et al. | 92—85 |
| 3,055,343 | 9/62 | Kurt | 92—110 |

FOREIGN PATENTS 3,624  12/64  Great Britain.

SAMUEL LEVINE, *Primary Examiner.*

RICHARD B. WILKINSON, *Examiner.*

UNITED STATES PATENT OFFICE
CERTIFICATE OF CORRECTION

Patent No. 3,202,062

August 24, 196

Robert W. Burden

It is hereby certified that error appears in the above numbered patent requiring correction and that the said Letters Patent should read as corrected below.

Column 2, line 63, for "hydarulic" read -- hydraulic --; column 4, line 50, for "part" read -- port --; column 5, line 71, for "for" read -- from --.

Signed and sealed this 15th day of March 1966.

(SEAL)
Attest:

ERNEST W. SWIDER
Attesting Officer

EDWARD J. BRENNER
Commissioner of Patents